United States Patent [19]
Philipps et al.

[11] Patent Number: 5,897,153
[45] Date of Patent: Apr. 27, 1999

[54] APPARATUS FOR REMOVING AND/OR RETURNING A DISK SHAPED OBJECT TO AND FROM A DISK HOLDER

[75] Inventors: Bernd Philipps, Untergruppenbach; Michael Bidmon, Gosbach; Michael Nille, Mühlhausen, all of Germany

[73] Assignee: Buro-und Datentechnik GmbH & Co., KG, Rottweil, Germany

[21] Appl. No.: 08/869,538

[22] Filed: Jun. 6, 1997

[30] Foreign Application Priority Data

Jun. 10, 1996 [DE] Germany ............................. 19623125

[51] Int. Cl.⁶ .................................................. B25J 15/10
[52] U.S. Cl. ............................................... 294/93; 294/95
[58] Field of Search ........................... 294/93–95, 97, 294/116, 81.52, 81.53, 86.24, 86.25, 89; 279/2.19, 2.2, 2.24; 901/36, 39

[56] References Cited

U.S. PATENT DOCUMENTS

| | | | |
|---|---|---|---|
| 1,277,716 | 9/1918 | Grosvenor | 294/95 |
| 2,528,873 | 11/1950 | Dorman | 279/2.2 |
| 3,131,961 | 5/1964 | Van Doros | 294/97 |
| 3,199,911 | 8/1965 | Alliot et al. | 294/116 |
| 4,121,868 | 10/1978 | Pierce et al. | 294/95 |
| 4,455,731 | 6/1984 | Morgan | 294/93 |
| 5,116,095 | 5/1992 | Kotrla | 294/94 |

FOREIGN PATENT DOCUMENTS

| | | | |
|---|---|---|---|
| 43 34 866 | 4/1995 | Germany . | |
| 958295 | 9/1982 | U.S.S.R. | 294/94 |
| 94/27293 | 11/1994 | WIPO . | |

*Primary Examiner*—Dean Kramer
*Attorney, Agent, or Firm*—Higgs, Fletcher & Mack LLP; Bernard L. Kleinke

[57] ABSTRACT

Apparatus for removing and/or returning a disk shaped object having a central hole to and from a disk holder, includes a pick-off head having movable pick-off elements adapted to grasp the disk-shaped object through its central hole, characterized in that the pick-off head includes a rotatable shaft coupled to the movable pick-off elements and provided in the central axis of the pick-off head and arranged so that when the shaft rotates the pick-off elements are reciprocated radially with respect to the central axis so that when the pick-off elements are positioned with respect to the central hole of the disk rests on at least two of the pick-off elements.

11 Claims, 4 Drawing Sheets

APPARATUS FOR REMOVING AND/OR RETURNING A DISK SHAPED OBJECT TO AND FROM A DISK HOLDER

FIELD OF THE INVENTION

The invention relates to an apparatus for removing and/or returning a disk-shaped object having a central hole from and/or to a disk holder, wherein the apparatus has a pick-off head with movable pick-off elements adapted to grasp the disk-shaped object through its central hole, and wherein the apparatus has a device to impart a lifting movement to the pick-off head vertically with respect to the disk holder and further has an actuating device for moving the pick-off elements.

BACKGROUND OF THE INVENTION

Apparatus of the generic type are known which serve for information carriers, such as compact disks or diskettes for example, to be removed from/deposited in disk holders and are part of players/recorders or archiving equipment.

Such an apparatus for a compact disk (CD) to be removed from and/or returned to a disk holder of a player/recorder is shown in WO-94/27293 and has a pick-off head with three L-shaped pick-off elements. The pick-off elements are arranged with the ends of their long limb portions in a suspended, swivelling condition and in circular-arc spacing of 120 degrees at the lower end of a connecting rod mounted in the vertical central axis of the pick-off head. The ends of the short limb portions of the L-shaped pick-off elements point radially away from the central axis of the pick-off head and, when the connecting rod is in the lower end position, form a diameter smaller than that of the central hole of the CD. To remove a CD from a disk holder having a through opening, the pick-off head is inserted with its pick-off elements into the central hole by means of a pneumatically acting, first lifting cylinder. In an upward movement of the connecting rod, by means of a pneumatically acting, second lifting cylinder forming part of an actuating device and provided at the upper end of the connecting rod, the pick-off elements are swivelled with their lower ends radially outwardly away from the central axis and are also drawn axially upwards. As a result, the CD is lifted out of the disk holder by means of the short L-shaped limb portions, is centered on the long limb portions and is urged against stop means provided above the CD on the pick-off head.

An apparatus for a compact disk (CD) to be removed from and/or returned to a disk holder of a player/recorder is shown in DE-A-43 34 866. This apparatus has a pick-off head in the form of a clamping device with two pick-off elements, each in the form of a semicircular clamping segment arranged at the lower end and around the central axis of the pick-off head. The first clamping segment is stationary and the second one is movable radially with respect to the central axis of the pick-off head and both segments have a diameter smaller than that of the central hole of the CD. To remove a CD from the disk holder having a through opening, the movable segment is drawn towards the stationary segment by means of a motor-driven spring-lever system of an actuating device in such a way that the CD is force-lockingly clamped at the inner wall of its central hole by the segments. The pick-off head carrying the CD is lifted by a separate motor-driven lifting device.

Drawbacks encountered with the described apparatus are in one respect their elaborate design, presenting a large overall height and large unit volume and separate drive assemblies for the device lifting the pick-off head and device actuating the pick-off elements. In another respect, the force-locking engagement of the disk-shaped objects, particularly the information carriers, leads to distortion, warping and hence to damage of the information carriers.

SUMMARY OF THE INVENTION

An object of the present invention is therefore to provide an apparatus of the kind set forth at the outset, which on the one hand is of cost-advantageous, simple and compact design with low overall height and on the other hand ensures that a disk-shaped object is grasped securely and free from damage in an automated environment.

The object is achieved in apparatus for removing and/or returning a disk shaped object having a central hole to and from a disk holder, the improvement comprising:

a pick-off head having movable pick-off elements adapted to grasp the disk-shaped object through its central hole, characterized in that the pick-off head includes a rotatable shaft coupled to the movable pick-off elements and provided in the central axis of the pick-off head and arranged so that when the shaft rotates the pick-off elements are reciprocated radially with respect to the central axis so that when the pick-off elements are positioned with respect to the central hole of the disk rests on at least two of the pick-off elements.

In an advantageous way, the pick-off elements are at a predetermined axial distance from a stop means which is disposed on the pick-off head and serves for contact with a disk-shaped object grasped by the pick-off head, or the pick-off elements assume a distance greater than the thickness of the disk-shaped object in its peripheral area of the central hole, so that the grasped disk-shaped object is held non-clampingly by the pick-off elements.

Furthermore, in an advantageous way, the rotatable shaft is rotatably disposed in a hollow cylinder element of the pick-off head, and the hollow cylinder element and the rotatable shaft are displaceable in common along their central axis in a carrier of the pick-off head by a lifting device.

In an advantageous way, the lifting device has a cylinder element, there being on the face and/or along the outer periphery of said cylinder element a control cam having a circumferential, axially and/or radially extending cam curve operatively connected to the pick-off head to impart thereto a lifting movement from a first end position for removing a disk-shaped object, to a second end position for infeed and back for depositing a disk-shaped object. The actuating device has arranged at the lowest point of the cam curve an actuating means for the pick-off elements, which lowest point corresponds to the first end position of the pick-off head for removing or depositing the disk-shaped object and in which the pick-off elements are actuable.

Furthermore, in an advantageous way, the drive device is operatively connected to the cylinder element; the pick-off head has a hollow cylinder element including arranged in the central axis thereof a rotatable shaft rotatable by the actuating means so as to assume a first and a second end position, whereby the pick-off elements are reciprocal radially with respect to the central axis; and the hollow cylinder element and the rotatable shaft are displaceable in common along their central axis in a bearing of the carrier by means of the control cam.

The further features and advantages of the invention are to be noted from the description, from the description, from the exemplary embodiments of the invention as are illustrated in the drawings, as well as from the further subclaims.

DETAILED DESCRIPTION OF THE PREFERRED EMBODIMENTS

The following description relates to an apparatus for removing and/or returning a disk-shaped object from and/or to a disk holder through a central hole in the disk.

The apparatus is usable in a unit (not shown), preferably a player/recorder of known type, such as archiving equipment or a disk changer for example, and the disk-shaped object takes the form of an information carrier, preferably a compact disk.

It will be apparent to those skilled in the art that other disk-shaped information carriers, such as gramophone records or diskettes for example, can also be removed from and deposited in the disk holder with the use of the inventive apparatus.

Figure 1:
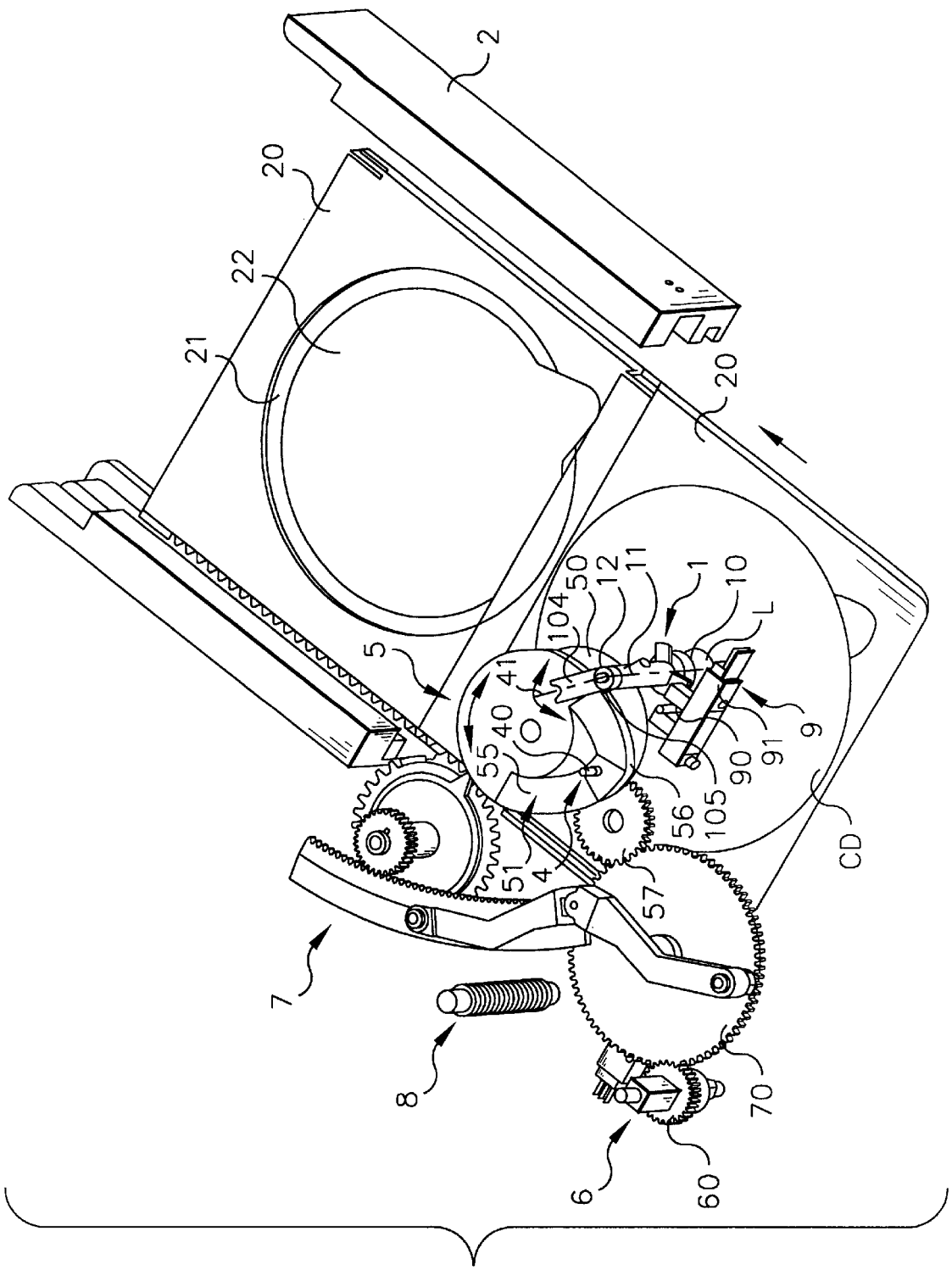
FIG. 1 is a perspective, plan view of the apparatus embodying the invention, with the pick-off head in an upper end position.

FIG. 1 apparatus is shown in an initial position for removing a compact disk CD from a disc holder 20, the disk holder being withdrawn to an external end position by a drawing device 7 from a magazine 2 or from a loading/unloading tray or drive of a player/recorder (the latter are not shown). The apparatus is positioned above the disk holder 20 by means of a diagrammatically shown Z-transfer device 8 and is disengaged.

Figure 2:
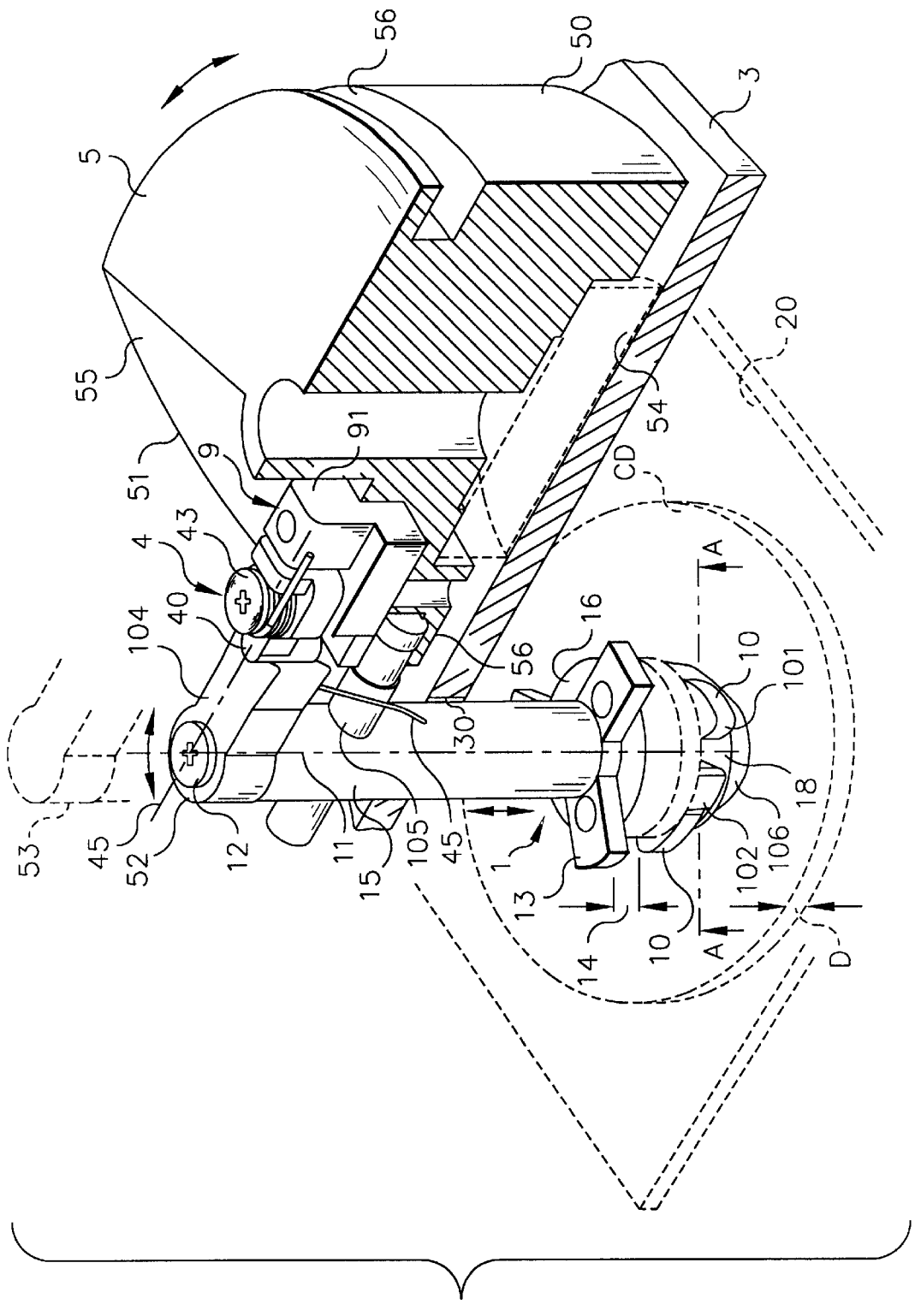
FIG. 2 is an enlarged, fragmentary, sectional view of the apparatus in FIG. 1, with the pick-off head in a lower end position.

The apparatus, as shown in FIG. 1 and FIG. 2, comprises a pick-off head 1, a carrier 3, an actuating device 4, lifting device 5 and drive device 6 for the pick-off head 1.

The pick-off head 1 has movable pick-off elements 10 for grasping and for holding a compact disk CD form-lockingly and further has, arranged in the central axis 11 of the pick-off head 1, a rotatable shaft 12 by means of which the pick-off elements 10 are reciprocal radially with respect to the central axis 11. The use of the term "form-lockingly" means taking advantage of the shape of the compact disk to hold it in position.

As shown in FIG. 2, the pick-off elements 10 are at a predetermined axial distance 14 from a stop means 13 which is disposed on the pick-off head 1 and serves for contact with a compact disk CD grasped by the pick-off head 1. The predetermined axial distance 14 is slightly larger than the thickness D of the CD in its peripheral area of its central hole L such that the grasped or removed CD is or can be held in an unclamped and centrald condition between the stop means 13 and the pick-off elements 10 on a shank of the pick-off head 1.

The rotatable shaft 12 is rotatably disposed in the pick-off head 1 shank taking the form of a hollow cylinder element 15, the hollow cylinder element and the rotatable shaft being displaceable in common along their central axis 11 in a bearing 30 of the carrier 3 by the lifting device 5.

The stop means 13 for the grasped CD is arranged concentrically on the outer periphery of the hollow cylinder element 15 and takes the form of three radially projecting bars angularly spaced through 120 degrees, and/or takes the form of an annular member (not shown) integral with the outer periphery of the hollow cylinder.

The hollow cylinder element 15 has at one end area 16, beneath the stop means 13, an outside diameter adapted with respect to the central hole L of the compact disk CD, i.e. a slightly smaller outside diameter for receiving the CD.

Figure 3:
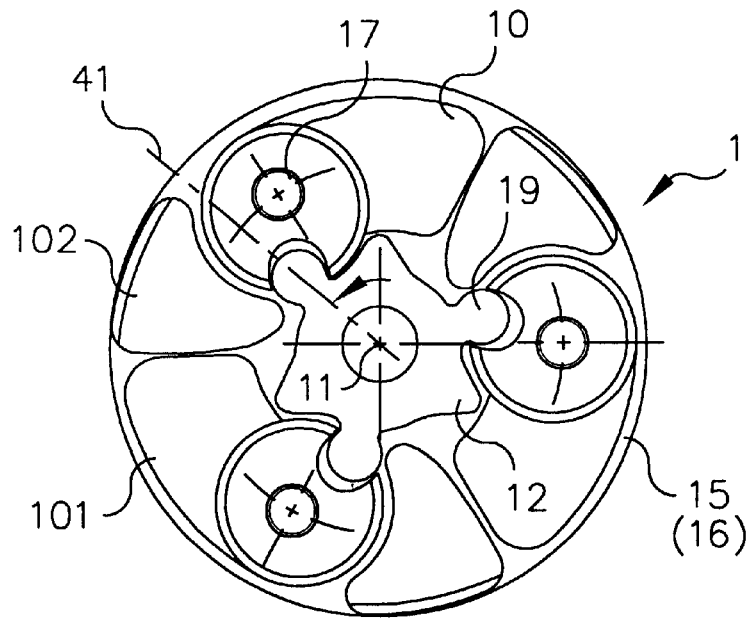
FIG. 3 is an enlarged, fragmentary, plan view of the pick-off head with pick-off elements of FIG. 1, taken along section line "A—A" of FIG. 2.
Figure 4:
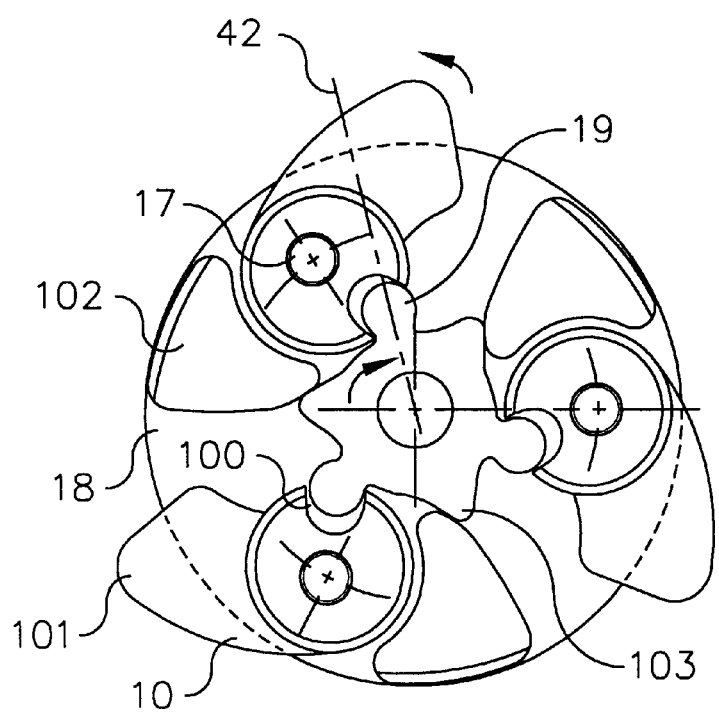
FIG. 4 is an enlarged, fragmentary, plan view of the pick-off head with pick-off elements of FIG. 2, taken along section line "A—A" of FIG. 2.

The pick-off elements illustrated in FIGS. 2 to 4 are arranged at the end area 16, i.e. at the lower end area 16 of the hollow cylinder element 15, vertically facing the compact disk CD and disk holder 20. The pick-off elements are mounted and guided on the hollow cylinder element by one bearing means 17 and guiding means 18 for each.

As in the preferred embodiment shown in FIGS. 3 and 4, the pick-off head 1 has at an angular spacing of 120 degrees three lobate and laminar pick-off elements 10 each arranged in a guide channel 18 and each eccentrically mounted on a bearing pin 17, the bearing pins being arranged axially parallel to the central axis of the pick-off head.

As shown in FIGS. 3 and 4, the rotatable shaft 12 has at its lower end area, in the region of its outer periphery, actuating elements 19 associated to and acting upon the pick-off elements in such a way that, upon rotation of the rotatable shaft 12 in a first direction by the actuating device 4 (see FIGS. 1 and 2), the outer ends of the pick-off elements are adapted to assume a first end position inside the cross-sectional profile of the hollow cylinder 15 and, upon rotation in a second direction, are adapted to assume a second end position outside the cross-sectional profile, that is, beyond the outer diameter of the hollow cylinder.

The actuating elements 19, in the form of actuating pins arranged parallel to the central axis 11, project with a form-fit into recesses 100 which are provided at the outer edge of the pick-off elements 10 and are adapted to the outer diameter of the actuating pins.

As the rotatable shaft 12 rotates in the second direction, departing from the first end position of the pick-off elements 10 shown in FIG. 3 by a predetermined angular amount of about 30 degrees, the pick-off elements together with their retaining lugs 101 arranged at the outer ends are swung radially outwardly in a spiral motion so far that on the one hand the outer ends securely hold the compact disk and on the other hand these ends do not project beyond the data-free edge surrounding the central hole of the CD.

The swing movement of the pick-off elements 10 is here predetermined on the one hand by the actuating device 4 acting upon the upper end area of the rotatable shaft 12, and on the other hand is limited by stop elements 102 provided on the hollow cylinder element 15. When the pick-off elements 10 are in their inner, first end position, the stop elements 102 act upon their retaining lugs 101. When the pick-off elements are in their outer, second end position, the stop elements 102 act upon lug cams 103 provided on the rotatable shaft 12.

For improved and dependable insertion of the pick-off head 1 through the central hole (L) of the compact disk CD to be removed, the pick-off head has at the outer end of its lower end area 16, and beneath the pick-off elements 10, a shank taper 106 which may also be arranged to locate the pick-off elements 10 and/or the rotatable shaft 12 in position (FIGS. 1 and 2).

As illustrated in FIG. 2, the pick-off head 1 has in the upper end area on the rotatable shaft 12 a driving means 104 for establishing an operative connection to the actuating device 4, and on the hollow cylinder member 15 has a driving element 105 for establishing an operative connection to the lifting device 5. The driving means 104 of the rotatable shaft 12 is also provided for locating and determining the position of the rotatable shaft relative to the hollow cylinder 15, and the driving element 105 of the hollow cylinder 15 is provided for locating and determining the position in the carrier 3.

In further, not illustrated configurations of the pick-off head 1, instead of three, only two pick-off elements 10 are arranged at an angular spacing of 180 degrees. Alternatively, on other hand, the pick-off elements 10 are linearly, radially movable by the inner ends of the pick-off elements being mounted and guided in outwardly spirally extending, slot-shaped/web-shaped cam segments arranged concentrically about the central axis 11 of the rotatable shaft.

Figure 5:
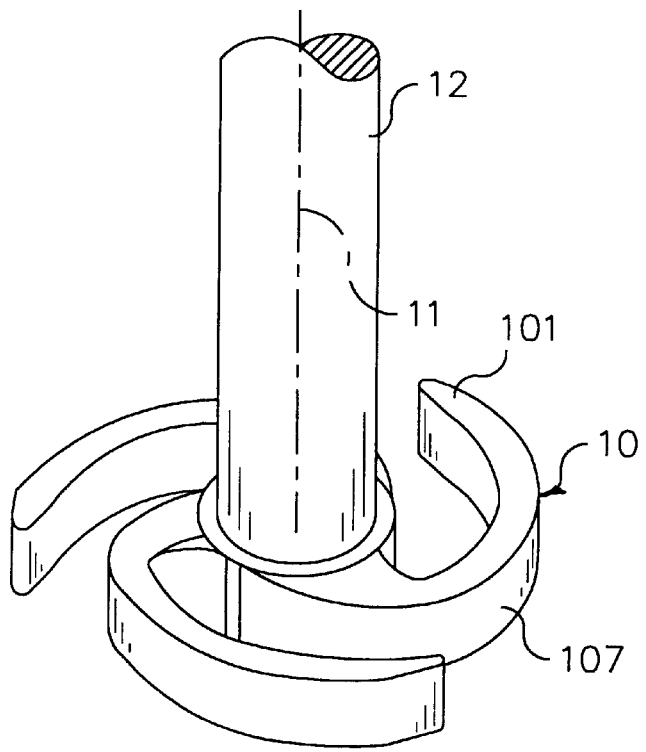
FIG. 5 is an enlarged, perspective, fragmentary view of a further embodiment of the pick-off elements shown in FIGS. 2 to 4.
Figure 6:
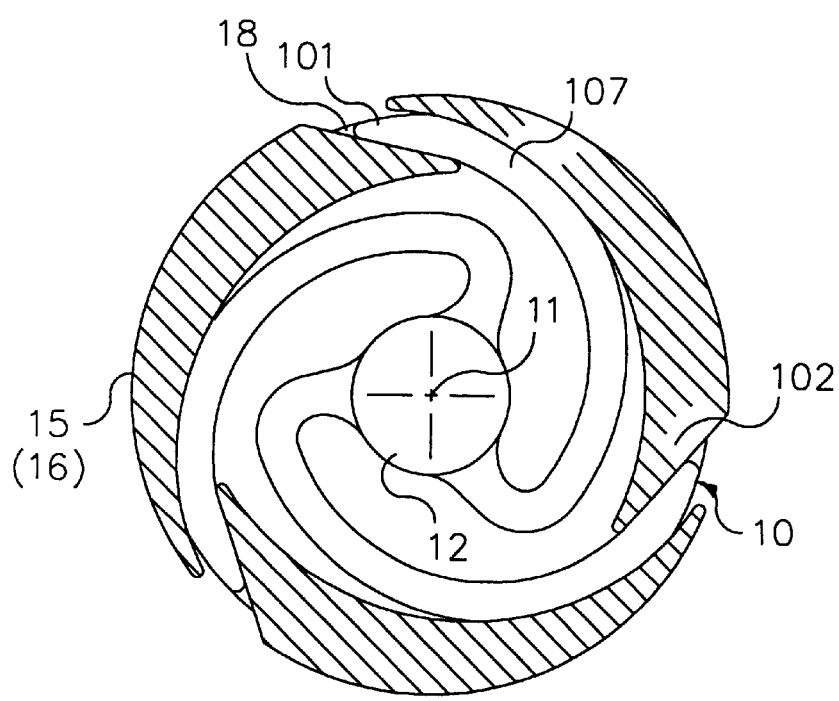
FIG. 6 is an enlarged, fragmentary, plan view of the pick-off elements of FIG. 5 in a further embodiment of the pick-off head of FIGS. 1 to 4, taken along section line "A—A" of FIG. 2.

FIGS. 5 and 6 show the pick-off head 1 in a further embodiment according to the invention, in which the pick-off elements 10 are swivel-mounted on the rotatable shaft 12 at the end area 16 thereof vertically facing the compact disk CD and disk holder 20 (see FIGS. 1 and 2), and one guide means 18 associated to each pick-off element guides them on the hollow cylinder 15 element in such a way that, upon rotation of the rotatable shaft in a first direction by the actuating device 4, the outer ends of the pick-off elements are adapted to assume a first end position inside the cross-sectional profile of the hollow cylinder 15 and, upon rotation in a second direction, are adapted to assume a second end position outside the cross-sectional profile of the hollow cylinder.

In this context, the pick-off elements 10 are integrally formed with the rotatable shaft 12 as an injection-molded part and are configured as springy, lobate bar elements 107 which in each case depart from the rotatable shaft to extend spirally outwards on a level, at right angles to the central axis 11.

The guide means 18, in the form of slots extending spirally outwards, hold and guide the bar elements as the rotatable shaft 12 rotates. As a result, depending on the direction in which the rotatable shaft rotates, the bar elements are diverged or compressed radially with respect to the central axis, that is, are coiled up or uncoiled, and the outer ends of the bar elements perform a spirally radial movement.

The actuating device 4, lifting device 5 and drive device 6 illustrated in FIGS. 1 and 2 for the described pick-off head 1 embodying the invention are characterized in that the actuating device 4 for the pick-off elements 10 is an integral component of the pick-off head-lifting device 5, and that the actuating device 4 and the lifting device 5 are drivable by means of a single drive device 6. The lifting device 5 has a cylinder element 50 rotatable about its central axis, there being on the upper face and/or along the periphery of said cylinder element a control cam element 51 having a circumferential cam curve which extends axially with respect to the central axis of the cylinder element and is operatively connected to the pick-off head 1 to impart thereto a lifting motion from a first, lower end position 52 for removing a compact disk CD, to a second, upper end position 53 for infeed and back for depositing a compact disk CD.

As shown in FIGS. 1 and 2, the actuating device 4 has a means 40 which serves to actuate the pick-off elements 10 of the pick-off head 1 and is arranged at the lowest point of the cam curve, which point corresponds to the first, lower end position 52 of the pick-off head 1 for removing or depositing the compact disk CD and in which the pick-off elements 10 are actuable. The drive device 6 is here operatively connected to the cylinder element 50, and the cylinder element and the pick-off head 1 are arranged in axially parallel relationship on the common carrier 3.

The control cam element 51 is composed on the one hand by a cam curve ring segment 55 situated on the face and extending about the central axis through an angular amount of about 180 degrees. The ring segment has in its central area, at the lowest point of the cam curve, an area about 30 degrees long which extends flat, parallel to the face and in the central of which is the actuating means 40 in the form of a pin arranged peripherally of the cylinder portion 50 and aligned with the central axis of the cylinder portion.

On the other hand the control cam element 51 is composed by a cam curve groove 56 arranged peripherally of the cylinder portion 50, beneath the cam curve ring segment 55 and following its cam curve.

The operative connection between the actuating device and the lifting device to the pick-off head 1 is established on the one hand in that the pin of the actuating means 40 is inserted in, or engages with, a V-shaped recess in the driving means 104 belonging to the pick-off head-rotatable shaft 12 and taking the form of a crank, and on the other hand in that the driving element 105 in the form of a pin projects into, and is guided in, the cam curve groove. The driving means 104 and the driving element 105 extend radially with respect to the central axis 11 of the pick-off head 1 and equidirectionally, parallel to each other, the driving means 104 being arranged above and at fixed, predetermined axial spacing to the driving element 105.

As shown in FIGS. 1 and 2, the operative connection between the lifting device 5 and the drive device 6 is established by means of a driven gear 54 which is rigidly mounted on the underside of a face of the cylinder element 50 confronting the carrier and meshes with a driving pinion 60 of a microprocessor-controlled drive motor (not shown) via an intermediate gear 57 and a control gear 70 of the disk holder drawing device 7.

The operation of the apparatus is as follows:

Starting from the above-described initial position of the apparatus as shown in FIG. 1, after the drive motor of the drive device 6 has been started, the cylinder element 50 of the lifting device 5 is rotated anticlockwise so that the pick-off head 1 with retracted pick-off elements 10 follows the cam curve of the control cam element 51 to depart from the upper end position 53 to assume the lower end position 52 (see FIG. 2), inserting the pick-off head 1 in the central hole L of the compact disk CD lying in the disk holder 20.

In so doing, the pick-off head 1 is moved downwards along its central axis 11 so far that its stop means 13 just fails to contact the CD surface. The control cam element 51 is here rotated so far that the actuating means 40 of the actuating device 4 just engages with the V-shaped recess in the driving means 104 situated in the first end position 41, but does not yet turn the driving means 104.

Furthermore, the base member 21 of the disk holder 20 has a recess in the region of the central hole L of the CD lying in the disk holder 20, to enable insertion of the pick-off head 1 in the central hole L of the CD.

As the cylinder element 50, viz. the control cam element 51, rotates further through about 15 degrees to assume its central position shown in FIG. 2, the rotatable shaft 12 of the pick-off head 1 is likewise rotated to assume its central position by means of the actuating means 40 and driving means 104 in such a way that the pick-off elements 10 of the pick-off head perform about half their radial movement and in so doing project beyond the outer periphery of the hollow cylinder element 15 of the pick-off head 1, whereby the pick-off elements project beneath the compact disk CD into the edge area around the central hole.

Further rotation of the control cam element 51 through about 15 degrees, to the end of its lower, flat region, places the pick-off elements 10 in their outer end position and renders the actuating means 40 disengaged from the driving means 104, the driving means 104 remaining in this second end position 42 through the agency of a friction means 45 arranged between the rotatable shaft and the hollow cylinder element 15.

By rotating the control cam element 51 further, the pick-off head 1 together with the compact disk CD removed from the disk holder 20 is lifted back to its upper end position 53.

Then, in a further rotatable motion of the lifting device 5 through about 180 degrees, the disk holder 20 is returned to the magazine 2 by the drawing device 7 and after that the drive motor is stopped.

Then the removed CD is conveyed by means of the Z-transfer device 8 to a drive of a CD player or recorder and there is deposited in its disk holder.

Deposit of the compact disk CD in a disk holder 20 is effected in reverse order by reversing the direction of rotation of the control cam element 51.

As shown in FIG. 1, a sensor device 9 is provided to recognize whether a compact disk CD is taken up by the pick-off head 1 or is present in the disk holder 20. The sensor device 9 has a feeler 90 mounted in the carrier 3 so as to be proximate and axially parallel to the pick-off head and further has a sensor 91 for sensing the position of the feeler. As the pick-off head lowers, the feeler, situated in a lower initial position, is put in an upper sensing position by a CD resting in the disk holder or by a CD taken up by the pick-off head.

To prevent blocking or damage of the actuating device 4 and/or pick-off head 1, the actuating means 40 has a protecting device 43 in the form of a springy coupling element.

In a further embodiment (not shown) of the apparatus, the cylinder element of the lifting device and the pick-off head are arranged with their central axes mutually perpendicular and the control cam element, that is, the path of its cam curve, extends radially with respect to the central axis of the cylinder element Further, in an additional embodiment (not shown) of the apparatus, the pick-off head is designed in such a way that its pick-off elements receive the CD at the outer edge, the pick-off elements being moved radially from the outside to the inside by the rotatable shaft so as to receive the CD. The extended pick-off elements projecting beyond the outer edge of the pick-off head-hollow cylinder are bent at their outer ends downwards and a short stretch back to the central axis of the pick-off head in such a way that the lower short portion of the pick-off element projects only into the outer, data-free edge area of the received CD. For non-clampingly receiving the CD, the distance between the upper and lower portion of the pick-up element is greater than the thickness of the CD and the pick-off elements are not urged against the outer edge of the CD. In addition, the upper, long portion serves as stop means for the received and held CD.

Furthermore, the outer edge of the disk holder has recesses or lifting means for the CD to enable removal of the CD from the disk holder by the described pick-off head, and the gear drive between drive unit and lifting device is realized by means of a belt drive.

The invention has been described in detail with particular reference to certain preferred embodiments thereof, but it will be understood that variations and modifications can be effected within the spirit and scope of the invention.

PARTS LIST

| | |
|---|---|
| CD | Disk-shaped object (Compact Disk) |
| L | Central hole |
| D | Thickness (CD) |
| 1 | Pick-off head |
| 2 | Magazine (for disk holder) |
| 3 | Carrier (for pick-off head & lifting/actuating devices) |
| 4 | Actuating device |
| 5 | Lifting device |
| 6 | Drive device (for actuating lifting/drawing devices) |
| 7 | Drawing device (for disk holder) |
| 8 | Z-transfer device |
| 9 | Sensor device |
| 10 | Pick-off elements (pick-off head) |
| 11 | Central axis (pick-off head) |
| 12 | Rotatable shaft |
| 13 | Stop means (for CD) |
| 14 | Axial distance (pick-off elements to stop means) |
| 15 | Hollow cylinder element |
| 16 | End area (hollow cylinder element) |
| 17 | Bearing means (for pick-off elements hollow cylinder element) |
| 18 | Guide means (for pick-off means in hollow cylinder element) |
| 19 | Actuating means (for pick-off means on rotatable shaft) |
| 20 | Disk holder (for CD) |
| 21 | Base member (of disk holder) |
| 22 | Recess (of disk holder) |
| 30 | Bearing (on carrier) |
| 40 | Actuating means (actuating device) |
| 41 | First end position (rotatable shaft) |
| 42 | Second end position (rotatable shaft) |
| 43 | Protecting device (actuating means) |
| 44 | Central position (rotatable shaft) |
| 45 | Friction means (rotatable shaft + hollow cylinder element) |
| 50 | Cylinder element (lifting device) |
| 51 | Control cam element (cylinder element) |
| 52 | First/lower end position (hollow cylinder element & rotatable shaft) |
| 53 | Second/upper end position (hollow cylinder element & rotatable shaft) |
| 54 | Driven gear (cylinder element/control cam) |
| 55 | Cam curve-ring segment |
| 56 | Cam curve-groove |
| 57 | Intermediate gear |
| 60 | Driving pinion (drive device) |
| 70 | Control gear (drawing device) |
| 90 | Feeler |
| 91 | Sensor |
| 100 | Recess (pick-off element) |
| 101 | Retaining lug (pick-off element) |
| 102 | Stop element (hollow cylinder) |
| 103 | Lug cam (rotatable shaft) |
| 104 | Driving means/crank (rotatable shaft) |
| 105 | Driving element/driving pin (hollow cylinder) |
| 106 | Shank taper (pick-off head) |
| 107 | Springy bar element (pick-off element) |

What is claimed is:

1. Apparatus for removing and/or returning a disk shaped object having a central hole to and from a disk holder, the improvement comprising:

a pick-off head having movable pick-off elements adapted to grasp the disk-shaped object through its central hole, wherein the pick-off head includes a rotatable shaft coupled to the movable pick-off elements that is provided along a central axis of the pick-off head and arranged so that, when the shaft rotates, the pick-off elements are reciprocated radially with respect to the central axis so that, when the pick-off elements are positioned with respect to the central hole of the disk, the disk rests on at least two of the pick-off elements;

wherein the pick-off elements are integrally formed with the rotatable shaft as an injection-molded part and are configured as springy, lobate elements which in each case depart from the rotatable shaft to extend spirally outwards on a level.

2. Apparatus as claimed in claim 1, characterized in that stop means disposed on the pick-off head are provided, the pick-off elements being disposed a predetermined axial distance from the stop means and adapted to contact a disk-shaped object grasped by the pick-off head, said distance being greater than the thickness of the disk-shaped object in its peripheral area of the central hole in such a way that the grasped disk-shaped object is held non-clampingly by the pick-off elements.

3. Apparatus as claimed in claim 1, characterized in that the pick-off head includes a hollow cylinder element and the rotatable shaft is rotatably disposed in the hollow cylinder element of the pick-off head, a lifting device including means for lifting the rotatable shaft and the hollow cylinder element to thereby displace a disk-shaped object along the central axis.

4. Apparatus as claimed in claim 3, characterized in that a stop means limits movement of the disk-shaped object and is arranged concentrically on the outer periphery of the hollow cylinder element.

5. Apparatus for removing and/or returning a disk shaped object having a central hole to and front a disk holder, the improvement comprising:

a pick-off head with movable pick-off elements adapted to grasp the disk-shaped object through its central hole, and wherein the apparatus has a lifting device to impart a lifting movement to the pick-off head vertically with respect to the disk holder and further has an actuating device for moving the pick-off elements, characterized in that the actuating device for the pick-off elements is an integral component of the pick-off head-lifting device, and that the actuating device and lifting device are driven by a single drive device;

wherein the lifting device has a rotatable cylinder element, a cam control element disposed in operative relationship with the rotatable cylinder element and having a circumferential axially and/or radially extending cam curve operatively connected to the pick-off head to impart thereto a lifting motion from a first end position for removing a disk-shaped object, to a second end position for depositing a disk-shaped object, and that the actuating device includes means which serves to actuate the pick-off elements and is arranged at the lowest point of the cam curve, which point corresponds to the first end position of the pick-off head for removing or depositing the disk-shaped object and in which the pick-off elements are actuable.

6. Apparatus as claimed in claim 5, characterized in that a common carrier is provided and the drive device is operatively connected to the cylinder element, and that the cylinder element and the pick-off head are arranged in axially parallel or axially perpendicular relationship on the common carrier.

7. Apparatus as claimed in claim 6, characterized in that the pick-off head has a hollow cylinder portion having in the central axis thereof a rotatable shaft rotatable to a first and second end position by the actuating means, the pick-off elements being reciprocal radially with respect to the central axis, and that the hollow cylinder element and the rotatable shaft are displaceable in common along their central axis in a bearing of the carrier by the control cam element.

8. Apparatus as claimed in claim 7, characterized in that the actuating device has a protecting device against blocking or damage.

9. Apparatus as claimed in claim 8, characterized in that the base portion of the disk holder has, in the region of the central hole of the disk-shaped object lying therein, a recess for the pick-off head and pick-off elements thereof, or that the disk holder has lifting means for the disk-shaped object to create a clearance for the pick-off head and pick-off elements thereof for removing or depositing the disk-shaped object.

10. Apparatus for removing and/or returning a disk shaped object having a central hole to and from a disk holder, the improvement comprising:

a pick-off head having movable pick-off elements adapted to grasp the disk-shaped object through its central hole, wherein the pick-off head includes a rotatable shaft coupled to the movable pick-off elements that is provided along a central axis of the pick-off head and arranged so that, when the shaft rotates, the pick-off elements are reciprocated radially with respect to the central axis so that, when the pick-off elements are positioned with respect to the central hole of the disk, the disk rests on at least two of the pick-off elements;

wherein the pick-off head further includes stop elements that act upon lug cam provided on the rotatable shaft when the pick-off elements are in an extended position.

11. An apparatus as claimed in claim 10, wherein the pick-off elements include retaining lugs and the stop elements act up the retaining lugs when the pick-off elements are in a retracted position.

* * * * *